Oct. 30, 1956     J. M. WRIGHT     2,768,924
CUSHIONING ELEMENT
Filed Jan. 26, 1956
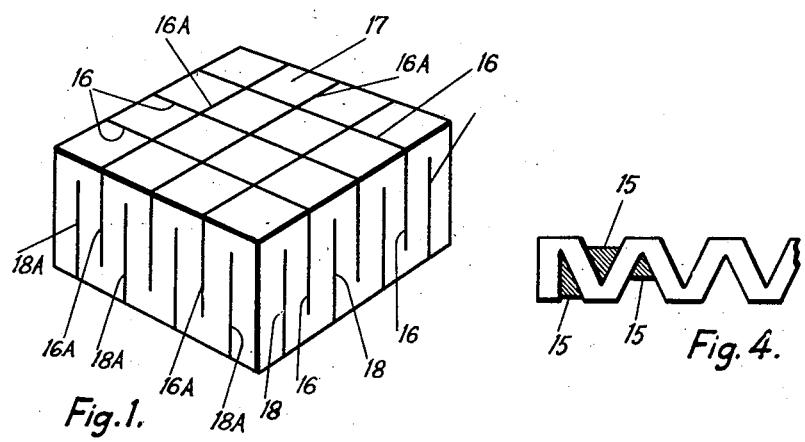
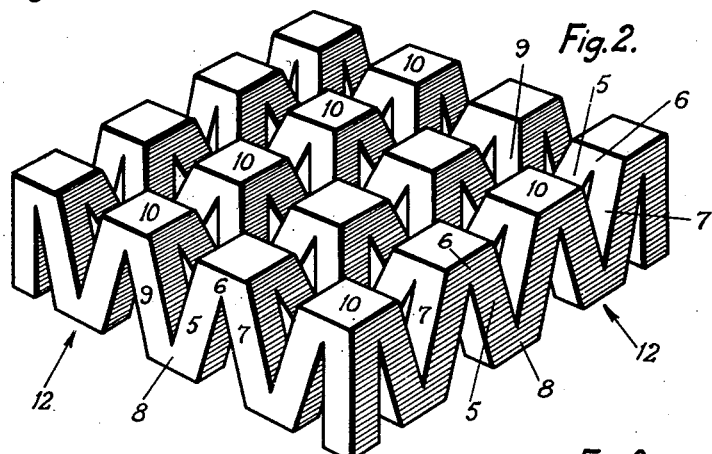
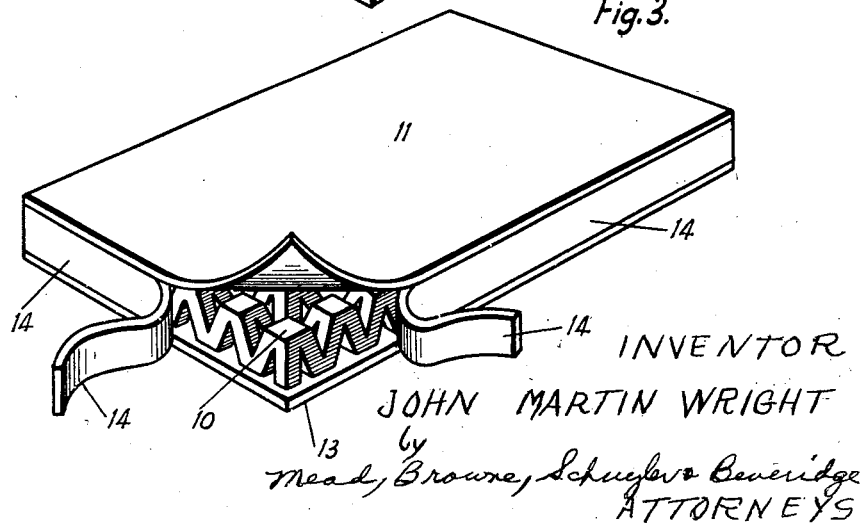
INVENTOR
JOHN MARTIN WRIGHT
by
Mead, Browne, Schuyler & Beveridge
ATTORNEYS

United States Patent Office 2,768,924
Patented Oct. 30, 1956

2,768,924

CUSHIONING ELEMENT

John Martin Wright, Wahroonga, New South Wales, Australia, assignor to Cable Makers Australia Proprietary Limited, Liverpool, New South Wales, Australia, a company Application January 26, 1956, Serial No. 561,545

Claims priority, application Australia June 14, 1956

9 Claims. (Cl. 154—124)

Cushioning elements made of foamed, cellular, or sponge-like resilient materials, are well known. Such media are used in simple slab forms where the cushioning element is required to be relatively thin; for example, only an inch or so in thickness, as is required for some forms of upholstery. Where the cushioning element is required to be relatively thick, say, up to and beyond five inches or so, as for sleeping mattresses and the like, it is uneconomic and otherwise undesirable to make the cushioning element as a large slab of uniform thickness, and consequently such "thick" elements are usually of cavity construction, being formed of a top relatively thin layer (and sometimes a similar bottom layer) supported by an integral plurality of crossing ribs, or a similar one-piece lattice-like, cavitied or skeletal structure.

Simple un-cavitied slabs of cellular resilient material can be made of rubber; or of many other media, which, as cushioning materials are markedly superior to rubber in many respects. On the other hand, thick cavitied cushioning elements cannot (by manufacturing methods available heretofore) be readily formed except by moulding, and consequently the materials out of which such elements have been made have been confined to materials which are mouldable in cellular condition. This means that until now such thick or cavitied cushioning elements have been made only of rubber and possibly some other mouldable materials, but not of those cellular materials (such as cellular polyester isocyanate for example) prepared by production of a true bubble foam which is subsequently solidified, and which therefore is not readily mouldable.

Irrespective of the materials available, however, there are several objectionable aspects to the manufacture of cavitied cellular cushioning elements by moulding; particularly in the moulding of such items as the cushioning elements for large-size mattresses and the like; because, for example, it necessitates the use of large, heavy and expensive moulds.

An object of the present invention is to provide an effective cavitied cellular cushioning element, and a very simple method of making it, whereby the former necessity for moulding operations is obviated. It follows that by this invention cavitied cushioning elements can be readily made out of any elastic cellular material quite irrespective of whether that material is or is not mouldable. Such materials are herein referred to collectively as "foam material."

According to this invention a cavitied cushioning element of cellular resilient material comprises at least three parts; namely, a pair of outside or "keeper" layers which are relatively thin slabs whereof the thickness if they are of foam material may be as required but preferably is not less than about one-half inch; and a cavity layer of any selected thickness, which is sandwiched between the outside layers and has its opposite faces secured thereto by adhesion or otherwise. The outside layers operate as an anchorage means whereby the open or lattice structure of the cavity layer is maintained in opposition to a resilient strain imposed thereon during manufacture.

A cushioning element according hereto may be summarised as consisting of; a cavity layer of foam material comprising a plurality of angularly spread apart columns each having its upper end integrally joined to the upper end of a neighbouring column, and its lower end integrally joined to the lower end of a second neighbouring column; a pliant keeper layer to which the tops of said columns are secured; and a second keeper layer to which the bottoms of said columns are secured.

The method of making cushioning elements according hereto consists in the steps of; slitting a slab of foam material from end-to-end and from one face thereof by a plurality of first incisions which stop short of the opposite face of the slab, slitting said slab from end-to-end and from said opposite face thereof by a plurality of second incisions which lie between said first incisions and stop short of said first mentioned face, laterally extending the incised slab thereby spacing the divided portions of said faces apart, sandwiching the extended slab between two keeper layers, and securing said spaced apart face portions to said keeper layers.

An example of the invention is shown in the drawings herewith.

Figure 1 is a perspective view of an incised slab of foam material.

Figure 2 is a similar view showing the same slab when laterally extended.

Figure 3 is a perspective view of a mattress with one corner opened to show the inside.

Figure 4 is a fragmentary side elevation of an incised and laterally extended slab incorporating a minor modification.

Referring mainly to Figure 2, the cavity layer comprises a plurality of angularly spread apart columns (one of which is marked 5 by way of example). Each of these columns has its upper end integrally joined at 6 (for example) to the upper end of a neighbouring column such as 7. Each column such as 5 also has its lower end integrally joined at 8 (for example) to the lower end of a second neighbouring column such as 9. The tops 10 of all the columns are secured by adhesion, heat-sealing or otherwise to a top keeper layer 11 (see Fig. 3), and the bottoms 12 of all the columns are similarly secured to a bottom or second keeper layer 13.

The columned cavity layer is made of foam material. The top and bottom keeper layers 11 and 13 are also preferably made of foam material. Alternatively, they may be made of heavy fabric or any pliable material which has a resistance to crumpling sufficient to oppose lateral contraction of the cavity layer, it having a tendency (as explained later herein) to revert to the closed up condition shown in Fig. 1. As a further alternative, the bottom keeper layer 13 may be of ply-wood or other unyielding board-like material, in which case the top keeper layer may be far less resistant to lateral crumpling than would otherwise be necessary, as, in that case the lateral contractile tendency of the cavity layer would be almost wholly counteracted by the stiffness of the unyielding bottom keeper layer.

A mattress or other cushioning element may consist in no more than two keeper layers and a cavity layer sandwiched between them as described above. For preference, however, the cavity layer is wholly enclosed by addition of foam material or other pliant cover strips such as 14 (Fig. 3), these strips being adhered to the sides of the cavity layer and/or the marginal portions of the keeper layers.

In some cushioning elements (such as those for chair seats for example) the marginal or other portions of the element may be required to be less resilient or yielding than the remainder. In such case the gaps between adjacent columns or rows of columns may be filled or partly filled by wedge shaped chocks such as those indicated at 15 in Fig. 4. These chocks may consist of foam material and they may be simply inserted in the column gaps or adhered or otherwise secured therein.

In making the cushioning element block or slab of foam material (see Fig. 1) is sawn or otherwise cut by a plurality of parallel incisions 16 which extend from one slab face 17 (other than an edge face of the slab) towards the opposite (or second) face but stopping short of that face by any selected amount (say, for example, from one-quarter to one-sixth of the slab thickness). Similar parallel cuts 18 are then made in the slab from the second face towards, but similarly stopping short of, the first face 17; these second cuts being centred between the first cuts. The slab so cut is then re-cut (16A and 18A) in exactly the same manner as above described but with the first and second re-cuts disposed at right angles to the first and second original cuts.

The slab when cut as above described, is then extended concertina fashion, but in two co-planar directions corresponding to the length and breadth of the original uncut slab. This gives the grouped array of inclined columns referred to above, and while this array is held extended in two directions the two outside faces (now subdivided to constitute the column tops 10 and bottoms 12) are secured to the top and bottom keeper layers.

It will be appreciated that the foregoing description is largely directed to a preferred embodiment of the present invention, and that there can be considerable structural variation therein without departure from the essence of the invention. For example, the cavity layer may be cut for lateral expansion in only one direction, that is, by omitting the recuts such as 16A and 18A; or a cushioning element may consist of a plurality of cavity layers having keeper layers secured to and between the adjacent capital (and pedestal) faces of the neighbouring cavity layers.

Moreover, the degree of lateral extension of the columns of the cut slab and/or the respective widths of adjacent columns may be varied throughout the cut slab or in selected areas thereof to meet specific requirements as to varied resiliency in selected portions of the cushioning element.

It will also be appreciated that the mentioned cuts may be of substantial width so as to be more in the nature of slots or grooves or "keyhole" slots in the slab or block prior to lateral extension thereof.

Although the slab cutting is preferably performed by knifing or sawing it may be effected by hot wires thus, in effect, to heat seal the severed surfaces and thus reduce likelihood of crumbling of the foam material.

I claim:
1. A cushioning element comprising, a cavity layer of foam material consisting of a plurality of angularly spread apart columns each having its upper end integrally joined to the upper end of a neighbouring column and its lower end integrally joined to the lower end of a second neighbouring column; a pliant keeper layer to which the tops of said columns are secured, and a second keeper layer to which the bottoms of said columns are secured.

2. A cushioning element according to claim 1 wherein each individual column of said angularly spread apart column is integrally joined at its upper end to three other similar columns, and wherein said individual column is integrally joined at its lower end to three similar columns other than those to which its upper end is joined.

3. A cushioning element according to claim 1 wherein both of said keeper layers are of pliant material.

4. A cushioning element according to claim 1 wherein said second keeper layer is of unyielding board-like material.

5. A cushioning element according to claim 1 wherein the sides of said cavity layer are closed by cover strips.

6. A cushioning element according to claim 1 which includes chocks in the gaps between some of said columns.

7. A method of making a cushioning element comprising the steps of: slitting a slab of foam material from end-to-end and from one face thereof by a plurality of first incisions which stop short of the opposite face of the slab, slitting said slab from end-to-end and from said opposite face thereof by a plurality of second incisions which lie between said first incisions and stop short of said first mentioned face, laterally extending the incised slab thereby spacing the divided portions of said faces apart, sandwiching the extended slab between two keeper layers, and securing said spaced apart face portions to said keeper layers.

8. A method according to claim 7 wherein said first incisions and said second incisions are each made in two directions at right angles to each other, and wherein the step of laterally extending the incised slab is performed in two co-planar directions.

9. A method according to claim 7 which includes the step of securing cover strips to the edges of the incised and laterally extended slab.

References Cited in the file of this patent
UNITED STATES PATENTS

| | | |
|---|---|---|
| 578,527 | Scotford | Mar. 9, 1897 |
| 2,268,049 | McGuire | Dec. 30, 1941 |
| 2,328,454 | Horwath | Aug. 31, 1943 |
| 2,434,232 | Singleton | Jan. 6, 1948 |
| 2,481,046 | Scurlock | Sept. 6, 1949 |
| 2,689,988 | French | Sept. 28, 1954 |

FOREIGN PATENTS

| | | |
|---|---|---|
| 434,550 | Great Britain | Sept. 4, 1935 |